Aug. 3, 1971   G. GERARD   3,597,302
LAMINATED PAPER PROTECTOR STRUCTURE
Filed Oct. 19, 1967   2 Sheets-Sheet 2
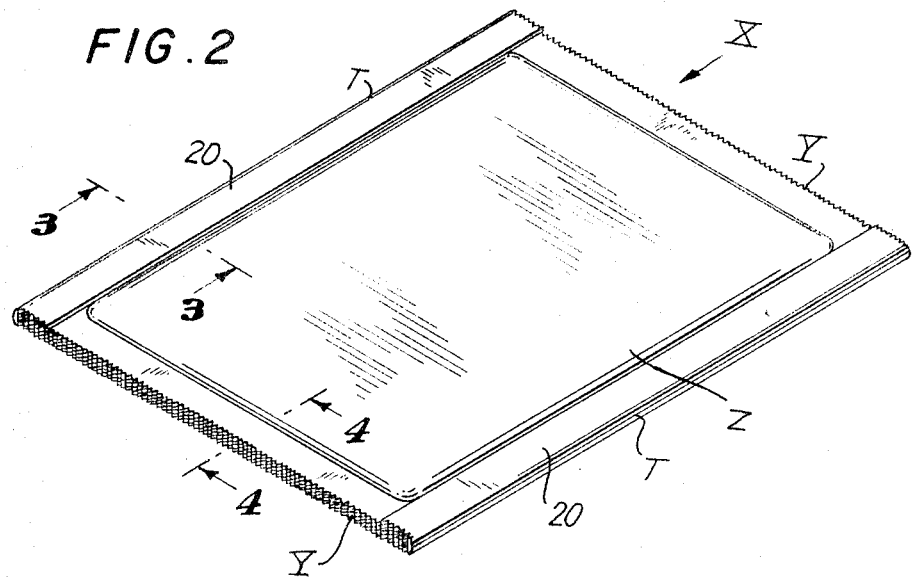
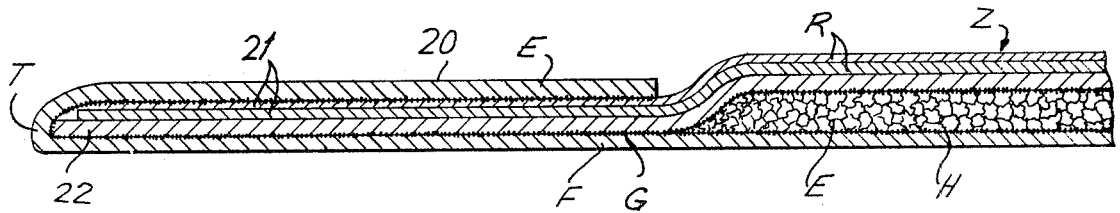
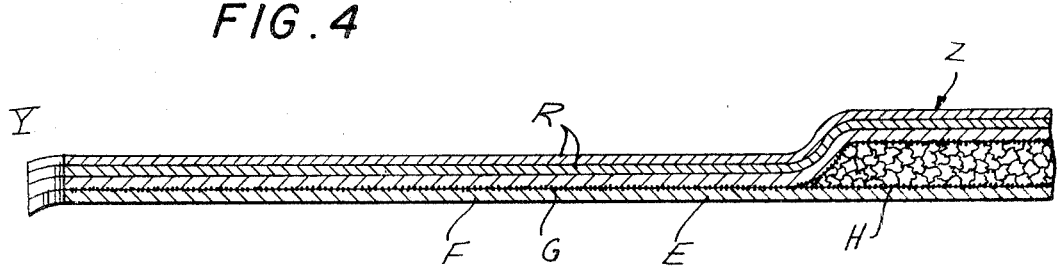
INVENTOR.
GEORGE GERARD
BY
ATTORNEY

3,597,302
LAMINATED PAPER PROTECTOR STRUCTURE
George Gerard, Point Pleasant, N.J., assignor to Jiffy
Manufacturing Co., Hillside, N.J.
Filed Oct. 19, 1967, Ser. No. 676,575
Int. Cl. B32b 3/04; B65d 65/38, 65/44
U.S. Cl. 161—105                                                  4 Claims

ABSTRACT OF THE DISCLOSURE

The disclosure sets forth a laminated paper structure having a fibrous filler enclosed between a plurality, and desirably two, sheets of a relatively strong paper stock, between which paper waste or fibrous materials are inserted to give a cushioned effect. The paper waste or fibrous material may be held in position by means of a flexible thermoplastic adhesive material of resinous nature, such as thermoplastic polymeric resinous adhesive, or less preferably glue, asphalt or similar adhesive materials, which is desirably applied to one or both of the inside faces of the envelope, package or laminated sheet. The side of the enclosure may also be provided with relatively thin soft sheets of tissue or light weight paper which will prevent abrasion and protect the contents of the envelope or the materials which are to be covered by the laminated papers for protection purposes.

---

The assembly and filling, together with the application of adhesion, takes place continuously from a series of rollers from assembling positions and the combination is cut at such intervals by means of a saw-toothed blade slot combination so that the cut edges are bent away from the plane of the laminated material and will not act to serve as shearing or cutting edges, which might affect the hands or cause any abrasion of the body of the handlers. All edges are desirably folded over so that there will be no sharp edges projecting which might have the tendency to cause any cutting effect.

SUMMARY OF THE INVENTION

Although the present invention will be particularly directed to a laminated filled or stuffed sheet, it may also be applied to paper boxes or other enclosures or to multilaminar sheet materials where paper is to be provided with filling or stuffing so that it may be used for protective envelope or protective cover.

It is among the objects of the present invention to provide a novel package of the character described, in which there is a laminated paper material having stuffing or protective material enclosed therein, the edges of which have been so formed as not to cause any cutting or abrasion of the section in contact therewith and so that the filling material will be held securely in position without undue shifting or movement and without too great loss if the package may be rupturing.

Another object is to provide a simple package, which will involve a minimum of manual labor and a maximum of production at low cost, and which will provide packages without serrating or cutting edges likely to cause injury to the hands or fingers of those who prepare said packages.

Another object is to provide a stuffed protective envelope or laminated paper package or cover in which the filling thereof will be held securely in place without displacement or lumping up during usage, and with a reduced fall-out of stuffing material upon ripping of the package.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory to provide a continuous assembly, according to which rolls of a relatively heavy strong paper are fed to an assembly position so that they may be laminated or joined together to form an envelope, package or bag.

Desirably, before the sheets are brought together on their adjacent faces or at least on one adjacent face, they may be suitably covered with a hot resinous adhesive material, or less preferably with glue, asphalt or similar adhesives, which will retain its adhesiveness for a predetermined period of time.

During this predetermined period of time the stuffing material, whether it be cut up paper or paper fragments, is fed between the sheets, and desirably, so that each fragment will adhere to the resinous material before it is converted into a dry flexible permanent adhesive material.

Generally the adhesive is applied to the adjacent inside faces of the paper sheets by roller cutting, and after the cut up waste paper or fibrous material has been dropped or inserted between the meeting sheets as they come together, there is a substantial compression so that the adhesively connected sheets will be compressed together with the inserted fibrous or waste paper material so as to assure a contact for engagement of the filling material with the adhesive surfacings, whereupon the pressure is released and the sheets spring apart after the adhesive connection has already been accomplished.

Desirably, after this compression and release with resultant expansion, the edges of the combined sheets are folded over so that there will be a smooth non-cutting edge. This is best accomplished by having the lower sheet wider than the upper sheet, with portions of the lower sheet extending beyond the edges of the upper sheet, then being adhesively coated so that they may be folded over to assure a desirably adhesive connection at each side of the laminated sheet combinations.

At the same time, with such combination it may be possible to add one, two or more thin facing sheets, as of a tissue or other paper of light weight, which will be folded into the adhesive edge bond when the edges are folded over. These adhesive sheets should be wider than the top sheet but narrower than the bottom sheet, so that they may be independently adhesively connected.

After the folding over and in the portions where folding has not been applied, the laminated structure may be cut into sections, to be used either as covers or backs, and this is desirably done by means of a serrated knife being forced into a slot across a thickness of the laminated sheet, with the result that the cut edges or points will be forced into the sheet to give a non-cutting edge.

BRIEF DESCRIPTION OF THE DRAWINGS

With the foregoing and other objects in view the invention consists of the novel construction, combination and arrangement of pairs as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 2 is a side diagrammatic perspective view of the cut off section of the laminated structure as produced by the procedure of FIG. 1.

FIG. 3 is a transverse fragmentary sectional view upon the line 3—3 of FIG. 2, upon an enlarged scale as compared to FIG. 2.

FIG. 4 is a transverse fragmentary sectional view upon the line 4—4 of FIG. 2 upon an enlarged scale as compared to FIG. 2.

DESCRIPTION OF THE PREFERRED EMBODIMENT

Figure 1:
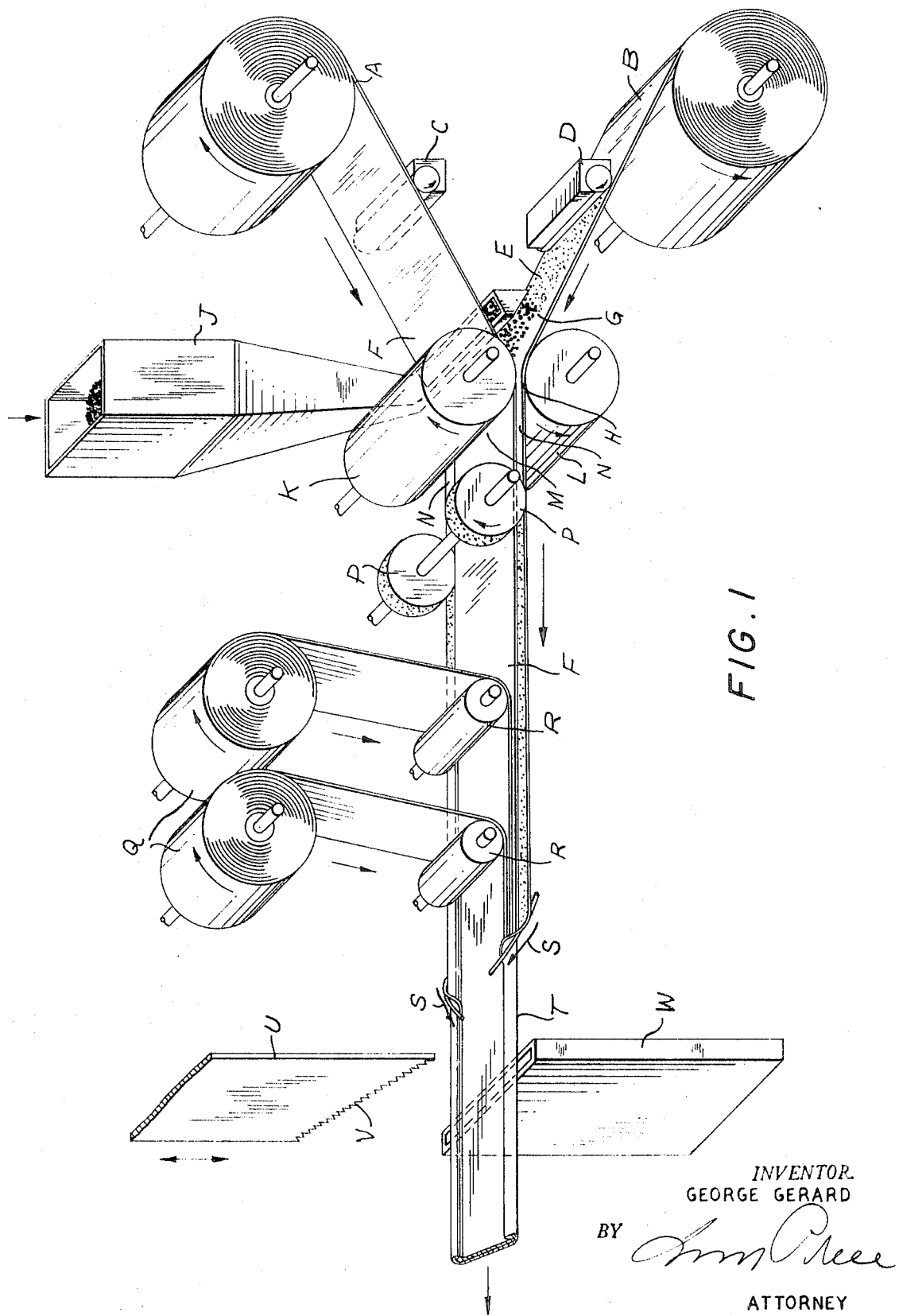
FIG. 1 is a side perspective elevational view showing the assembly operation used in making the superimposed laminated paper protective material.

Referring to FIG. 1, the upper paper roll A and the lower paper roll B both feed sheets of kraft or other strong paper toward the left over and under the adhesive coater rollers C and D, which apply a thin layer of a flexible adhesive E to the adjacent faces of the sheets F and G. Between the sheets F and G as they come together is spread the fibrous or chopped up waste paper material H from the hopper feed J, which may be provided with the usual screw feed means, as well as the suitable shaker means to assure uniform distribution for the lateral width of the paper as it is being assembled.

The mixture is then lightly compressed without substantial flattening between the pressure rollers K and L, assuring compression of the waste paper H, as well as contact of the pressure material with the thin layer of adhesive E before it hardens.

In position M the paper will spring back and expand under the expansion of the cut paper material H. It will be noted that, since the upper sheet F is narrower than the lower sheet G, there will be provided extensions N which are then coated by adhesive by means of the roller cutter P. Where it is desired to have extra surfacing sheets, desirably of tissue paper, rolls of such paper may be provided at Q to supply sheets thereof indicated at R on top of the uppermost sheet F or terminating short of the edges of the sheet G, so that the adhesive applied by the roller cutters P will be effective to hold them in position when the sheets are acted upon by the in-folders S to form the folded smooth edge T.

The vertical reciprocating cutter U has a serrated edge B, which will extend into the slotted receiver so as to cut and turn down the edges of the laminated structure. The final laminated structure is shown at X in FIG. 2 and it has serrated cut edges Y.

The protective area Z will contain the stuffing material H over the central area Z, where protection is needed in connection with furniture, books or other articles which may be covered or wrapped or held therein.

Referring particularly to FIGS. 2 to 4, the adhesive surface E on the inside face of the upper sheet F and the lower sheet G are held together by this adhesive E, which is desirably applied when solvent but in heating condition so that it will adhere to the sheet in the form of a thin layer and be depressed into contact with the filler material H by means of the nip rollers K and L. The cut off by the blade U will leave a series of projections W projecting downwardly into the slotted member W, with the result that the bend down edges of the projections Y will not be a cutting edge but will be a smooth non-shearing surface which will not cut or abrade or injure the hands.

The tissue paper facings move relatively to each other and to the surface of the top sheet F so as to prevent abrasion or scuffing of the articles therein. As the result of the pressure which has been applied between the rollers K and L, the stuffing material H will have some adhesive connection through the strand to either the adhesive E on the upper lamination F or the lowermost lamination G.

At the same time the folding over of the lowermost lamination G, as indicated at 20 in FIGS. 2 and 3, by reason of the adhesive E will hold the in-turned edges 21 of the tissue layers R in position and will also hold the ends or edge 22 of the lower lamination F in position. This folding over as indicated at T gives a smooth non-cutting edge and also reinforces the package on each side of the filler area Z.

As many changes could be made in the above laminated paper protector structures, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed.

What is claimed is:

1. A rectangular laminated multi-layer super-imposed paper protector strip padded and filled with resilient short increments of cut-up waste paper serving as a loose stuffing, for wrapping and enclosing furniture, crockery, books and the like, comprising inside and outside kraft paper strips, said outside strip being wider than said inside strip, adhesive coatings on and covering the entire inside faces of said strips, particles of loose stuffing extending between said strips with portions in contact with and adhesively attached to at least one of said adhesive coatings, said stuffing being lightly compressed, said outside strips having outwardly projecting portions folded inwardly at their longitudinal edges to form longitudinal folds, adhesive coatings on the inside of said longitudinal side folds attaching the folds to the narrow inside sheet and forming smooth non-cutting side edges and transverse end serrated edges between said folds, with the points of said serrated edges bent to one side of the plane of the protector strip, and a soft tissue-like paper strip narrower than and overlaying the inside kraft strip and held in position and overlapped by the longitudinal side folds.

2. The protector of claim 1, including a plurality of tissue paper laminations disposed adjacent the exterior face of said inside strip and held between said side folds and adhesively connected within said side folds along said longitudinal edges.

3. The protector of claim 1, said adhesive consisting of a thermoplastic resinous material compressed with the stuffing in advance of solidification.

4. The protector of claim 1, wherein said inside and outside strips comprise a base sheet and a covering sheet, flexible polymeric adhesives on the interior faces of said sheets, thin layers of stuffing material extending between said sheets and connected to said adhesives in lightly compressed condition and tissue paper sheets extending over the covering sheet, said sheets being held together by the inwardly folded edges of the base sheet extending over the marginal edges of the covering sheet and the tissue paper sheets.

References Cited

UNITED STATES PATENTS

| 1,899,892 | 2/1933 | D'Este et al. | 229—51 |
| 2,342,839 | 2/1944 | Byers | 161—99 |
| 3,057,538 | 10/1962 | Ashcraft | 229—53 |

OTHER REFERENCES

Mills, Geo. J.: Paper Cutting Machines and Techniques, Geo. J. Mills, Pittsburgh, Pa. (1949), p. 10 relied on.

JOHN T. GOOLKASIAN, Primary Examiner

W. E. HOAG, Assistant Examiner

U.S. Cl. X.R.

161—84, 104, 126; 206—46; 229—14, 53, 55, 87